US008843719B2

(12) United States Patent
Benhase et al.

(10) Patent No.: US 8,843,719 B2
(45) Date of Patent: Sep. 23, 2014

(54) MULTI-TARGET, POINT-IN-TIME-COPY ARCHITECTURE WITH DATA DUPLICATION (71) Applicant: International Business Machines Corporation, Armonk, NY (US)

(72) Inventors: Michael Thomas Benhase, Tucson, AZ (US); Theresa Mary Brown, Tucson, AZ (US); Lokesh Mohan Gupta, Tucson, AZ (US); Carol Santich Mellgren, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/842,047

(22) Filed: Mar. 15, 2013

(65) Prior Publication Data
US 2013/0212347 A1 Aug. 15, 2013

Related U.S. Application Data (63) Continuation of application No. 13/043,394, filed on Mar. 8, 2011, now abandoned.

(51) Int. Cl.
*G06F 12/16* (2006.01)
*G06F 3/06* (2006.01)
(52) U.S. Cl.
CPC ............... *G06F 3/065* (2013.01); *G06F 3/061* (2013.01); *G06F 3/0683* (2013.01); *G06F 3/0641* (2013.01)
USPC ..... 711/162; 711/103; 711/117; 711/E12.069
(58) Field of Classification Search
USPC .............................. 711/162, 103, 117, E12.069
See application file for complete search history.

(56) References Cited

U.S. PATENT DOCUMENTS

| 7,360,048 | B2 | 4/2008 | Agombar et al. |
| 7,472,242 | B1 | 12/2008 | Deshmukh et al. |
| 2004/0250034 | A1 * | 12/2004 | Yagawa et al. ................ 711/162 |
| 2004/0260882 | A1 | 12/2004 | Martinez et al. |
| 2008/0189482 | A1 | 8/2008 | Fuente |
| 2009/0089483 | A1 | 4/2009 | Tanaka et al. |

OTHER PUBLICATIONS

Debnath et al., "ChunkStash: Speeding up Inline Storage Deduplication using Flash Memory," Microsoft Research, Proceedings of the 2010 USENIX conference, 2010.
Haug, et al., "Integrating Mature Data Deduplication Technologies—Redefining the Backup/Recovery Paradigm," last accessed at: http://vmwarevforum2010.com/oslo/presentations/ATEA_Data_Domain.pdf, Mar. 23, 2010.
USPTO Office Action, U.S. Appl. No. 13/043,389, Notification Date: Mar. 29, 2013.

\* cited by examiner

*Primary Examiner* — Yong Choe
(74) *Attorney, Agent, or Firm* — Nelson and Nelson; Daniel P. Nelson; Alexis V. Nelson (57) ABSTRACT A method for performing a write to a source volume in a multi-target architecture is described. The multi-target architecture includes a source volume and multiple target volumes mapped thereto. In one embodiment, such a method includes copying data in a track of the source volume to a corresponding track of a target volume (target x). The method enables one or more sibling target volumes (siblings) mapped to the source volume to inherit the data from the target x. When the data is successfully copied to the target x, the method performs a write to the track of the source volume. Other methods for reading and writing data to volumes in the multi-target architecture are also described.

5 Claims, 9 Drawing Sheets

| Track | Target Volume 1 (TV1) | | Target Volume 2 (TV2) | |
|---|---|---|---|---|
| | TBM | Extent Data | TBM | Extent Data |
| 1 | 0 | SV Data | 0 | TV2 Data |
| 2 | 1 | | 0 | SV Data |
| 3 | 1 | | 1 | |
| 4 | 1 | | 1 | |
| 5 | 1 | | 1 | |
| 6 | 1 | | 1 | |

Fig. 10

| Track | Target Volume 1 (TV1) | | Target Volume 2 (TV2) | | Target Volume 3 (TV3) | |
|---|---|---|---|---|---|---|
| | TBM | Extent Data | TBM | Extent Data | TBM | Extent Data |
| 1 | 0 | SV Data | 0 | TV2 Data | 1 | |
| 2 | 1 | | 0 | SV Data | 1 | |
| 3 | 1 | | 1 | | 0 | SV Data |
| 4 | 0 | SV Data | 0 | TV2 Data | 1 | |
| 5 | 0 | TV1 Data | 1 | | 1 | |
| 6 | 1 | | 0 | SV Data | 0 | TV3 Data |

Fig. 11

MULTI-TARGET, POINT-IN-TIME-COPY ARCHITECTURE WITH DATA DUPLICATION

BACKGROUND

1. Field of the Invention

This invention relates to data replication, and more particularly to apparatus and methods for creating point-in-time copies of data while minimizing data duplication.

2. Background of the Invention

Data replication functions such as IBM's Flash Copy, Hitachi's ShadowImage, or the like, may be used to generate nearly instantaneous point-in-time copies of logical volumes or data sets. Among other uses, these point-in-time copies may be used for disaster recovery and business continuity purposes. IBM's Flash Copy in particular creates a point-in-time copy by establishing a relationship (or "mapping") between a source volume and a target volume. Once this relationship is established, data may be read from either the source volume or target volume. A target bit map associated with a target volume keeps track of which data tracks have actually been copied from the source volume to the target volume. In certain cases, volumes may be arranged in a cascaded configuration such that certain volumes function as both targets and sources. In other cases, volumes may be arranged in a flat (or "multi-target") configuration such that a source volume has relationships with multiple target volumes.

Nevertheless, I/O performance can be impacted significantly as the number of volumes increases in either a cascaded or multi-target configuration. For example, in a cascaded configuration, a write to a source volume may need to wait for data to be copied between various volumes in the cascade before the write can be performed. Thus, the larger number of volumes in the cascade, the larger number of copies that need to occur before data can be written to the source volume. Similarly, in a multi-target configuration, a write to a source volume may need to wait for data to be copied to each connected target before the write can be performed. The larger number of volumes in the multi-target configuration, the larger number of copies that need to occur before data can be written to the source volume. This can make a write to a source volume very slow. For this reason, current Flash Copy implementations typically only allow a limited number of targets in a multi-target configuration to keep the performance impact within an acceptable range.

In view of the foregoing, what are needed are methods to reduce the performance impact of having large numbers of volumes in cascaded or multi-target configurations. More specifically, methods are needed to reduce data duplication in cascaded or multi-target configurations when performing writes. Yet further needed are methods to more efficiently perform reads in cascaded or multi-target configurations.

SUMMARY

The invention has been developed in response to the present state of the art and, in particular, in response to the problems and needs in the art that have not yet been fully solved by currently available methods. Accordingly, the invention has been developed to provide methods for performing reads and writes to volumes in multi-target architectures, while reducing data duplication. The features and advantages of the invention will become more fully apparent from the following description and appended claims, or may be learned by practice of the invention as set forth hereinafter.

Consistent with the foregoing, a method for performing a write to a target volume (target x) in a multi-target architecture is disclosed herein. The multi-target architecture includes a source volume and multiple target volumes mapped thereto. In one embodiment, such a method includes determining whether the target x has a closest older sibling (COS). The COS is a target volume established just before the target x. The method then determines whether a target bit map (TBM) for each of the target x and the COS are set. If the TBMs for both the COS and the target x are set, the method copies data from a higher source (HS) volume to the COS. If the TBM for the COS is set and the TBM for the target x is not set, the method copies the data from the target x to the COS. Once the copy is complete, the method performs the write to the target x. A corresponding computer program product is also disclosed and claimed herein.

In another aspect of the invention, a method for performing a read on a target volume (target x) in a multi-target architecture is disclosed herein. The multi-target architecture includes a source volume and multiple target volumes mapped thereto. In one embodiment, such a method includes reading a target bit map (TBM) associated with the target x and determining whether the TBM is set. If the TBM is set, the method reads data from a higher source (HS) volume. Reading data from the HS volume includes the following: finding the source volume associated with the target x; finding, by inspecting generation numbers (GNs) on the source volume, the next younger sibling relative to the target x; and reading the data from the next younger sibling if a TBM associated with the next younger sibling is not set.

In yet another aspect of the invention, a method for performing a write to a source volume in a multi-target architecture is disclosed herein. The multi-target architecture includes a source volume and multiple target volumes mapped thereto. In one embodiment, such a method includes copying data in a track of the source volume to a corresponding track of a target volume (target x). The method enables one or more sibling target volumes (siblings) mapped to the source volume to inherit the data from the target x. When the data is successfully copied to the target x, the method performs a write to the track of the source volume.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
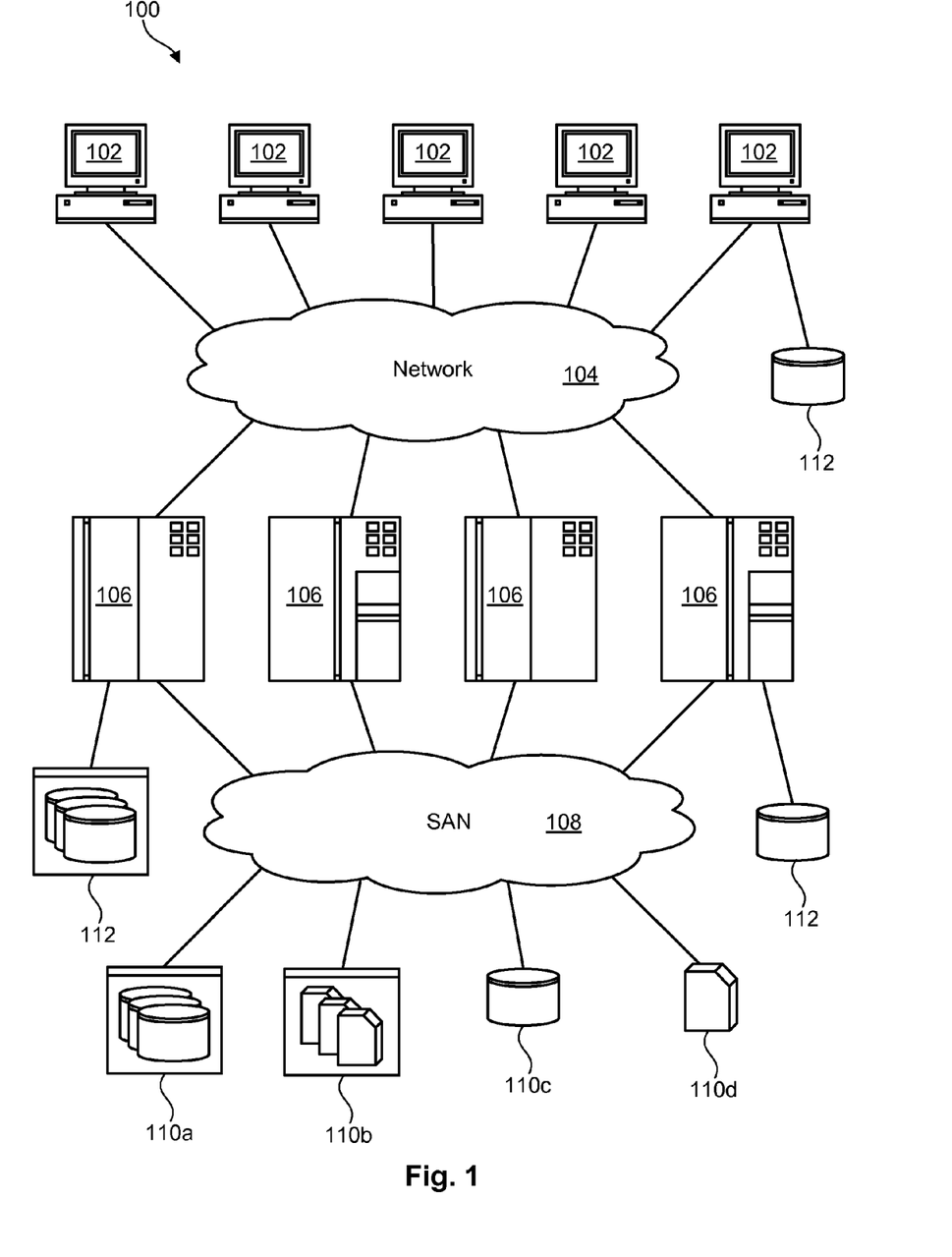
FIG. 1 is a high-level block diagram showing one example of a network architecture comprising various types of storage systems.

Referring to FIG. 1, one example of a network architecture 100 is illustrated. The network architecture 100 is presented to show one example of an environment where a point-in-time-copy methodology in accordance with the invention may be implemented. The network architecture 100 is presented only by way of example and not limitation. Indeed, the methodology disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the point-in-time-copy methodology disclosed herein.

The network architecture 100 may, in certain embodiments, include a storage network 108 behind the servers 106, such as a storage-area-network (SAN) 108 or a LAN 108

(e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the point-in-time-copy methodology disclosed herein.

Figure 2:
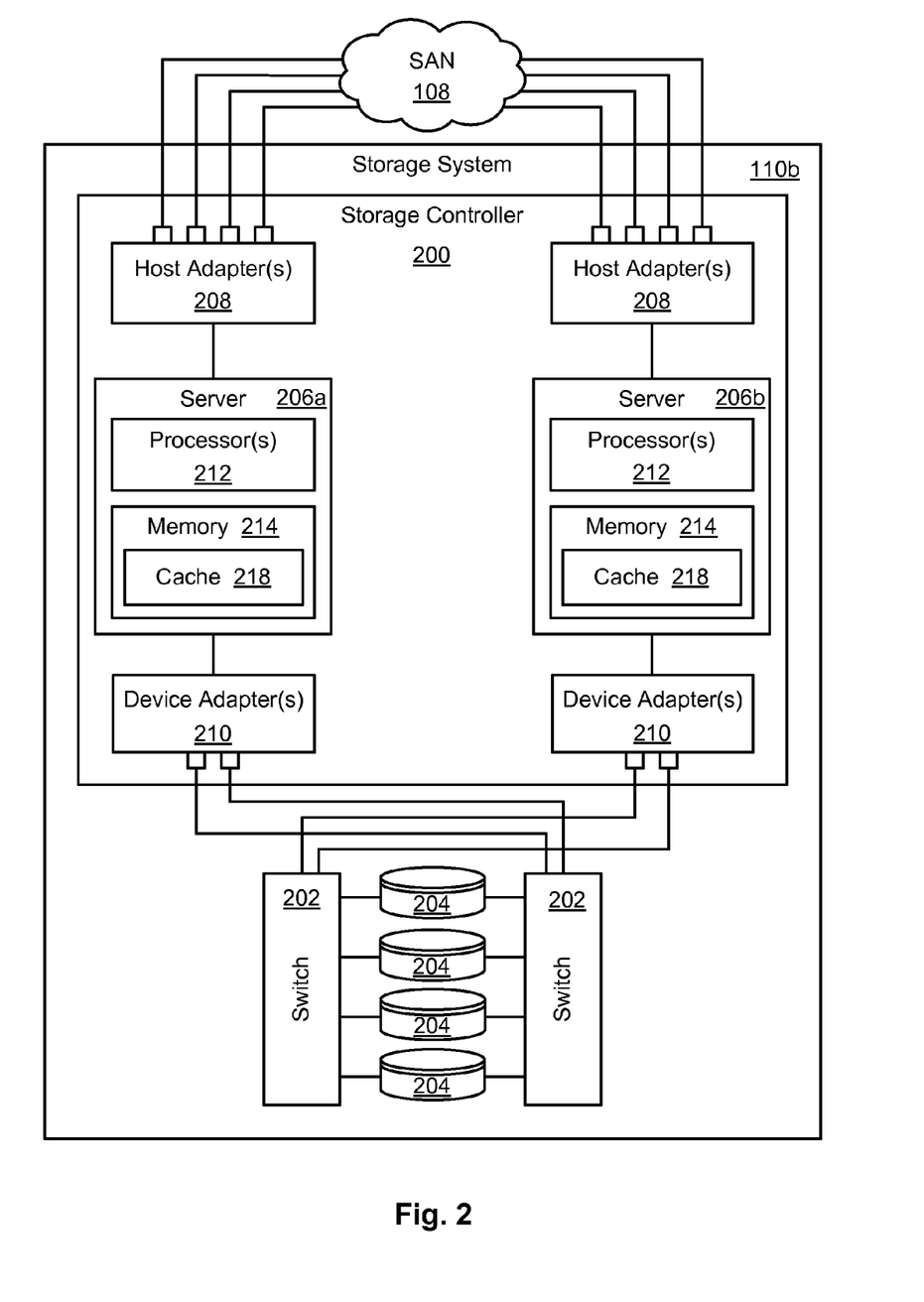
FIG. 2 is a high-level block diagram showing one example of a storage system where a methodology in accordance with the invention may be implemented.

Referring to FIG. 2, one embodiment of a storage system 110b containing an array of hard-disk drives 204 and/or solid-state drives 204 is illustrated. The internal components of the storage system 110b are shown since the point-in-time-copy methodology disclosed herein may, in certain embodiments, be implemented within such a storage system 110b, although the methodology may also be applicable to other storage systems 110. As shown, the storage system 110b includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. Nevertheless, the methods disclosed herein are not limited to the IBM DS8000™ enterprise storage system 110b, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 (e.g., an open system or mainframe server 106) performs a read operation, the server 206 that performs the read may fetch data from the storages devices 204 and save it in its cache 218 in the event it is needed again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218. The server 106 may then destage the write to the storage devices 204 as time and resources allow.

Figure 3:
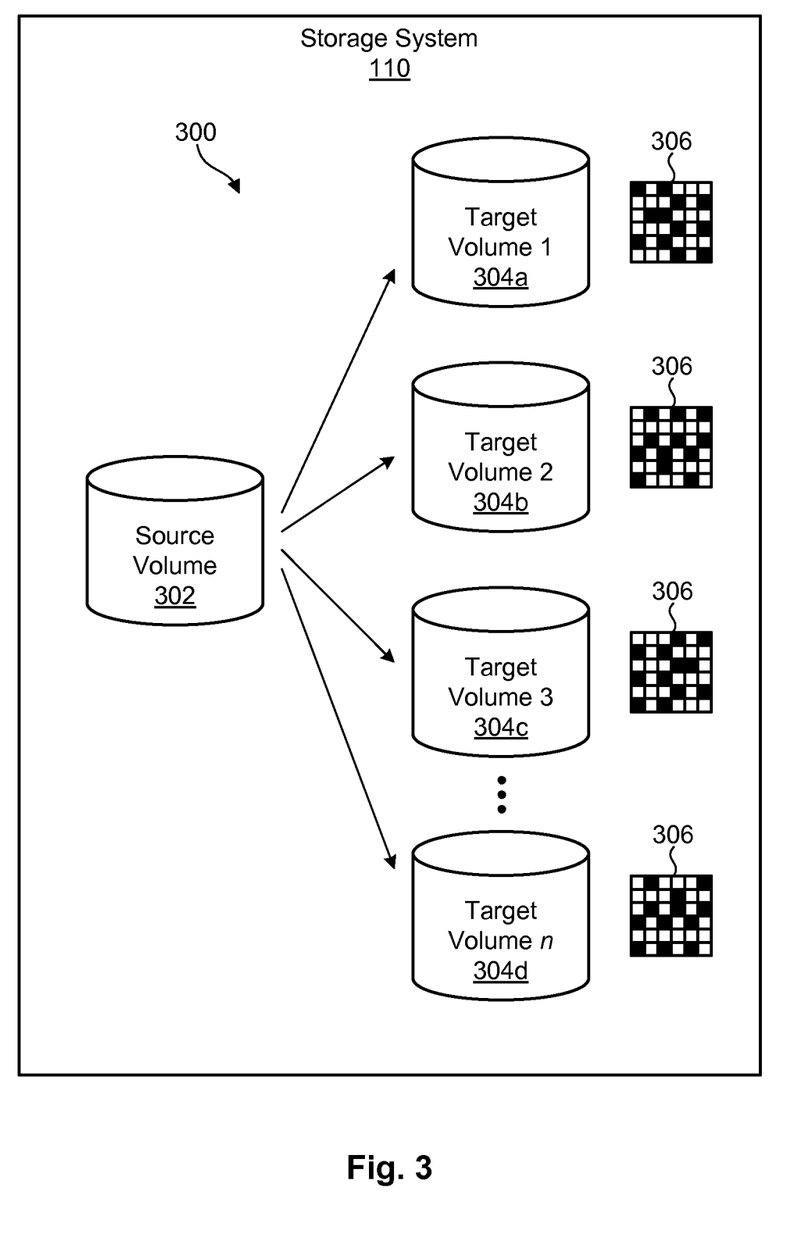
FIG. 3 is a high-level block diagram showing one example of a multi-target architecture comprising a source volume mapped to multiple target volumes.

Referring to FIG. 3, one example of a multi-target architecture 300 for creating point-in-time copies is illustrated. Such an architecture 300 may be implemented within a storage system 110, such as the storage system 110b illustrated in FIG. 2. As shown, the multi-target architecture 300 includes a source volume 302 and one or more target volumes 304a-d. Each of the target volumes 304a-d contains a point-in-time copy of data in the source volume 302. In selected embodiments, such as in Flash Copy implementations, a point-in-time copy is created by establishing a relationship (or "mapping") between a source volume 302 and a target volume 304. Once this relationship is established, data may be read from either the source volume 302 or target volume 304 even though data may still not be copied from the source volume 302 to the target volume 304. A target bit map (TBM) 306 associated with a target volume 304 keeps track of which data tracks have actually been copied from the source volume 302 to the target volume 304. For example, a "0" in the TBM 306 may indicate that a data track has been copied (i.e., the target volume 304 has its own data), whereas a "1" may indicate that a data track has not yet been copied. In cases where the TBM 306 contains a "1," a read to a track on the target volume 306 may be directed to the corresponding track on the source volume 302. For the purposes of this disclosure, a bit in a TBM 304 is said to be "set" if it contains a "1" and "reset" if it contains a "0," although this could be reversed in other embodiments.

As previously mentioned, in conventional multi-target architectures 300, a write to a source volume 302 may need to wait for data in the source volume 302 to be copied (i.e., destaged) to each connected target volume 304a-d not containing its own data before the write can be completed to the source volume 302. That is, before a write is performed on a data track of the source volume 302, the existing data track needs to be copied to target volumes 304a-d that do not already contain the data track before the data track on the source volume 302 is overwritten. The larger the number of target volumes 304a-d in the multi-target architecture 300, the larger number of copies that need to occur before data can be successfully written to the source volume 302. This can make a write to the source volume 302 very slow. For this reason, conventional point-in-time-copy technologies may only support a limited number (e.g., twelve) of targets 304 in multi-target architectures 300 to keep the performance impact within an acceptable range.

As will be explained in more detail hereafter, an improved methodology in accordance with the invention may be used reduce the performance impact of having multiple target volumes 304a-d mapped to a source volume 302. Instead of copying data to multiple targets 304a-d when a write is performed on the source volume 302, the improved methodology copies the data to a single target 304 or a subset of the targets 304. An inheritance scheme then enables other targets 304 to inherit the data from the single target 304 or subset of targets 304 that contain the data. In this way, a write to a source volume 302 may only need to copy data to a single target 304 or a subset of the targets 304 before the write can be completed on the source volume 302. The flow diagrams illustrated in FIGS. 4 through 8 show various specific examples of methods to implement such a methodology.

Figure 4:
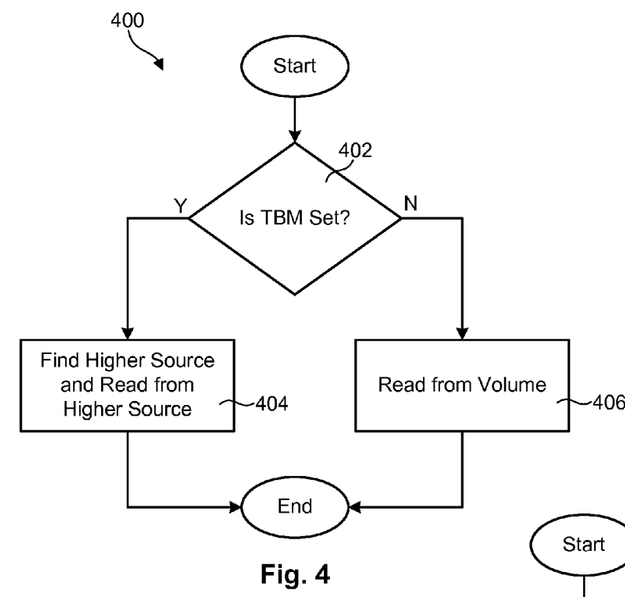
FIG. 4 is a high-level block diagram showing one embodiment of a method for reading a track from a target volume.

Referring to FIG. 4, one example of a method 400 for reading a track from a target volume 304 is illustrated. Upon receiving a request to read a data track from a target volume 304, the method 400 determines 402 whether the TBM of the target volume 304 is set. If the TBM is not set (indicating that the target volume 304 contains the requested data), the method 400 simply reads 406 the requested data track from the target volume 304. On the other hand, if the TBM is set (indicating that the target volume 304 does not contain the requested data), the method 400 finds 404 a higher source (HS) volume from which to read the data, and reads 404 from the HS volume. One method 700 for finding the HS volume is described in association with FIG. 7. For the purposes of this disclosure, the HS volume is the volume that contains the requested data and from which the target volume 304 inherits.

Figure 5:
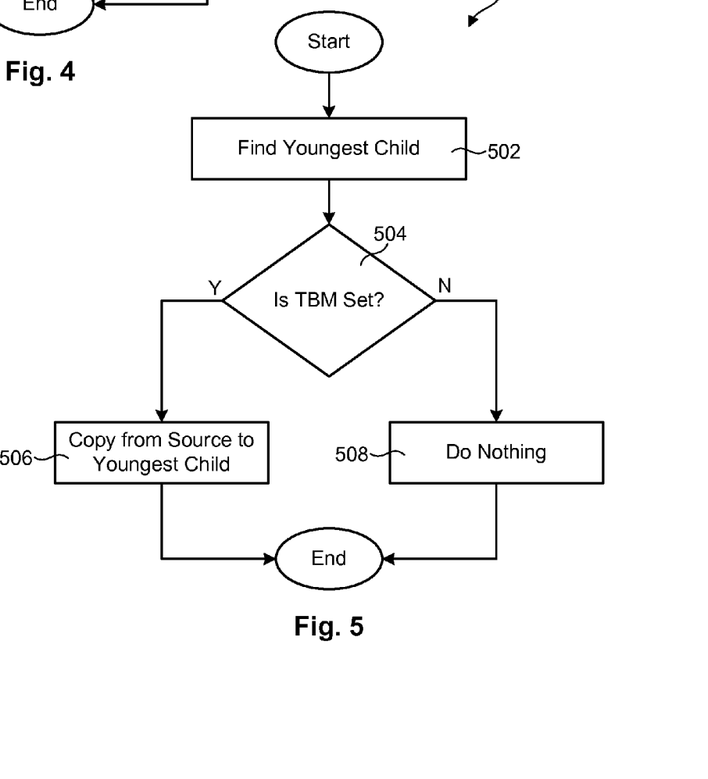
FIG. 5 is a flow diagram showing one embodiment of a method for copying a data track in response to a write to a source volume.

Referring to FIG. 5, one embodiment of a method 500 for destaging a data track in response to a write to a source volume 302 is illustrated. As shown, the method 500 initially finds 502 the youngest child (YC) of the source volume 302. For the purposes of this disclosure, the YC is the target volume 304 that was last mapped to the source volume 302. In selected embodiments, generation numbers (GNs) may be used to determine the order in which target volumes 304 were added to the source volume 302 in order to generate point-in-time copies. The manner in which GNs are used to determine the order the targets 304 were mapped to the source volume 302 will be discussed in association with FIG. 9.

Once the method 500 finds the YC, the method 500 determines 504 whether the TBM of the YC is set. If the TBM is not set (indicating that the YC 304 contains its own copy of the data), the method 500 does nothing 508 since the YC 304 already has a copy of the data. On the other hand, if the TBM is set (indicating that the YC 304 does not contain its own copy of the data), the method 500 copies 506 the data from the source volume 302 to the YC 304. In this way, when a write occurs to the source volume 302, a single copy is made between the source volume 302 and the YC 304 as opposed to copying the data to all target volumes 304 not containing the data. The other target volumes 304 (not the YC 304) may then inherit this data from the YC 304, such as when a read is made to the other volumes 304 or when data is copied from the other volumes 304.

Figure 6:
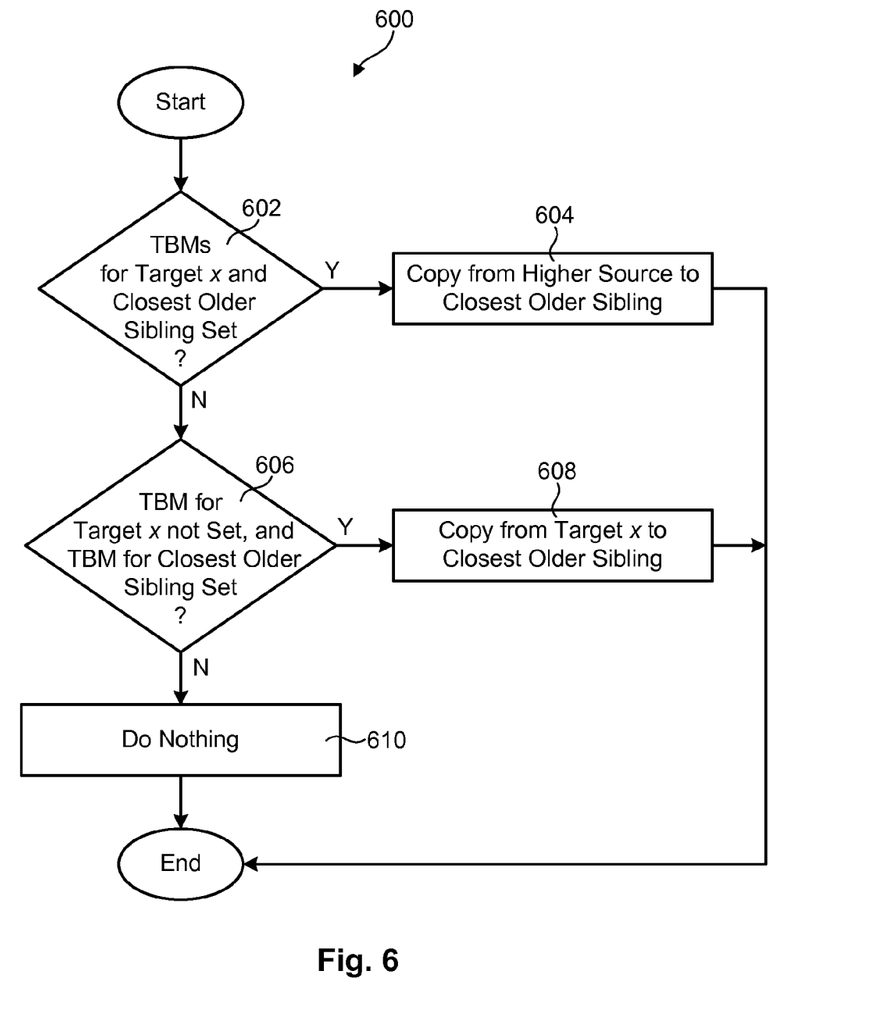
FIG. 6 is a flow diagram showing one embodiment of a method for copying a data track in response to a write to a target volume.

Referring to FIG. 6, one embodiment of a method 600 for destaging a data track in response to a write to a target volume 304 (target x) is illustrated. As shown, the method 600 initially determines 602 whether the TBMs for the target x 304 and the closest older sibling (COS) 304 are set for the track that is being written to. For the purposes of this disclosure, the COS is the target volume 304 that was mapped just before the target x 304. If both of the TBMs are set (indicating that neither volume contains the data in the track being written to), the method 600 copies 604 the data track from the higher source (HS) volume to the COS 304. A method for finding the HS volume will be discussed in association with FIG. 8. On the other hand, if the TBM for the target x is not set and the TBM for the COS is set (indicating that the target x 304 contains data in the data track being overwritten), as determined at step 606, the method 600 copies 608 the data track from the target x to the COS 304—i.e., the data track is destaged from the target x 304 to the COS 304. On the other hand, if the TBM of the COS is not set (indicating that the COS contains the data), or there is no COS, the method 600 does nothing 610 since no copy is needed. Once the end of the method 600 is reached, the write may be performed on the target x.

It should be recognized that the methods 500, 600 described above could be modified in various ways without departing from the essence of the invention. For example, the youngest child (YC) could be replaced by the oldest child, and the closest older sibling (COS) could be replaced by the closest younger sibling. Thus, for the purposes of this disclosure, embodiments that utilize the YC and the COS are also deemed to encompass embodiments that utilize the oldest child and closest younger sibling. Other variations are also possible and within the scope of the invention.

Figure 7:
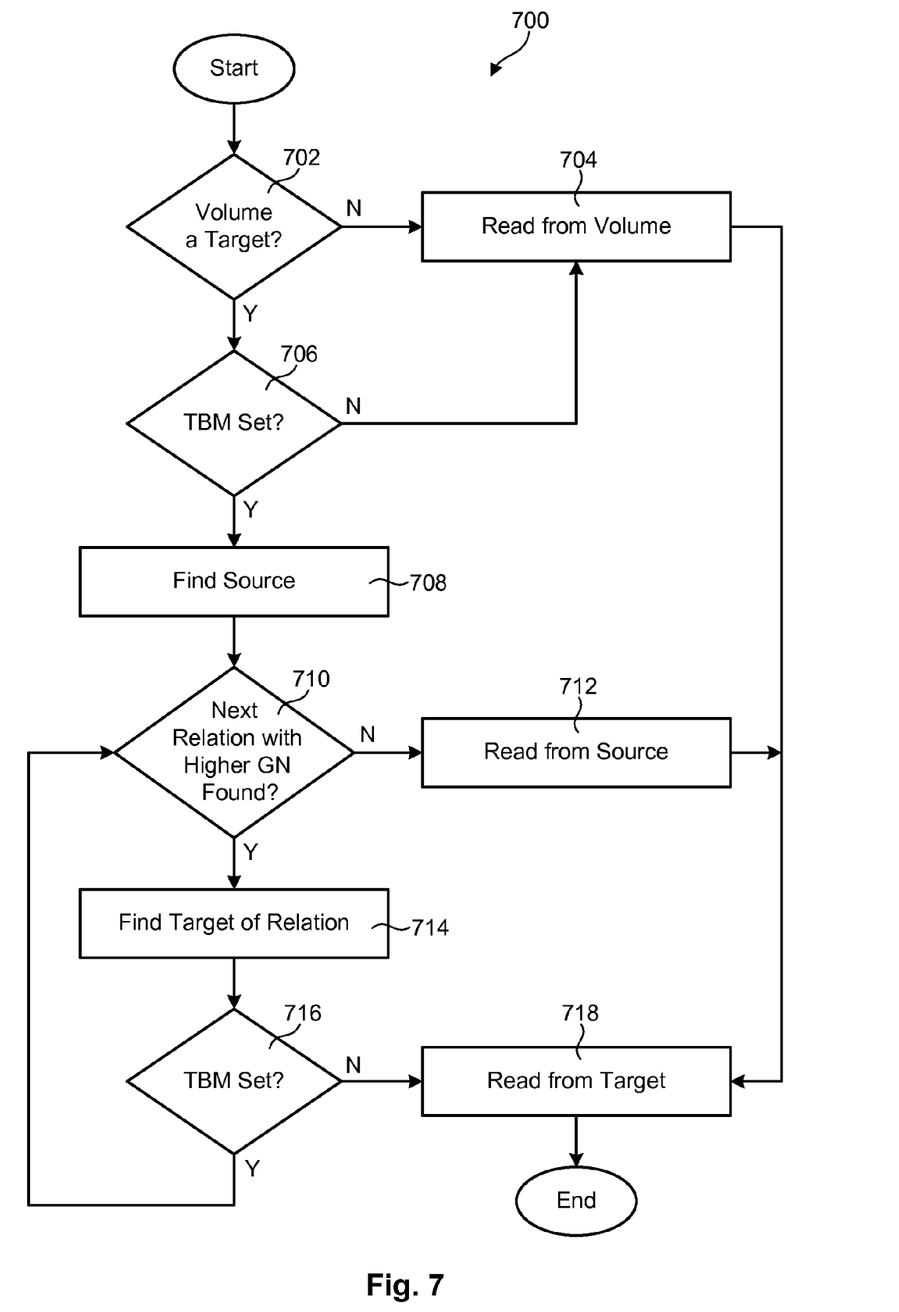
FIG. 7 is a flow diagram showing one embodiment of a method for finding a higher source (HS) volume in response to a read to a volume.

Referring to FIG. 7, one embodiment of a method 700 for finding the HS volume for a read is illustrated. Such a method 700 may be used in association with step 404 of FIG. 4. As shown, the method 700 initially determines 702 whether the volume being read is a target volume 304. If not, the method 700 reads 704 from the volume since it is a source volume 302. If the volume is a target volume 304, the method determines 706 whether the TBM of the volume is set. If the TBM is not set, the method 700 reads 704 from the volume 304. If the TBM of the volume is set, the method 700 finds 708 the source volume 302 associated with the target volume 304. The method 700 then finds 710 the next relation with a generation number (GN) just higher than that of the subject target volume 304. The manner in which the GNs are used will be explained in more detail in the example of FIG. 9.

In general, the decision step 710 finds the relation on the source volume 302 that is just younger than the relation associated with the subject target volume 304 (as identified at step 702). The method 700 then finds 714 the target 304 of this relation. If the TBM of this target 304 is set 716, the method 700 reads from the target 304. If the TBM of this target 304 is not set 716, the method 700 repeats steps 710, 714 to find the next younger target 304 and determine 716 whether its TBM is set. In this way, the method 700 traverses through the younger siblings of the target volume 304 identified at step 702 until the target volume 304 containing the desired data is found. Once this data is found, the method 700 reads 718 from the target 304. If no younger sibling target 304 containing the desired data is found, the method 700 simply reads 712 from the source volume 302. In this way, a target volume 304 is able to inherit data from a sibling 304 when a read is performed thereto.

Figure 8:
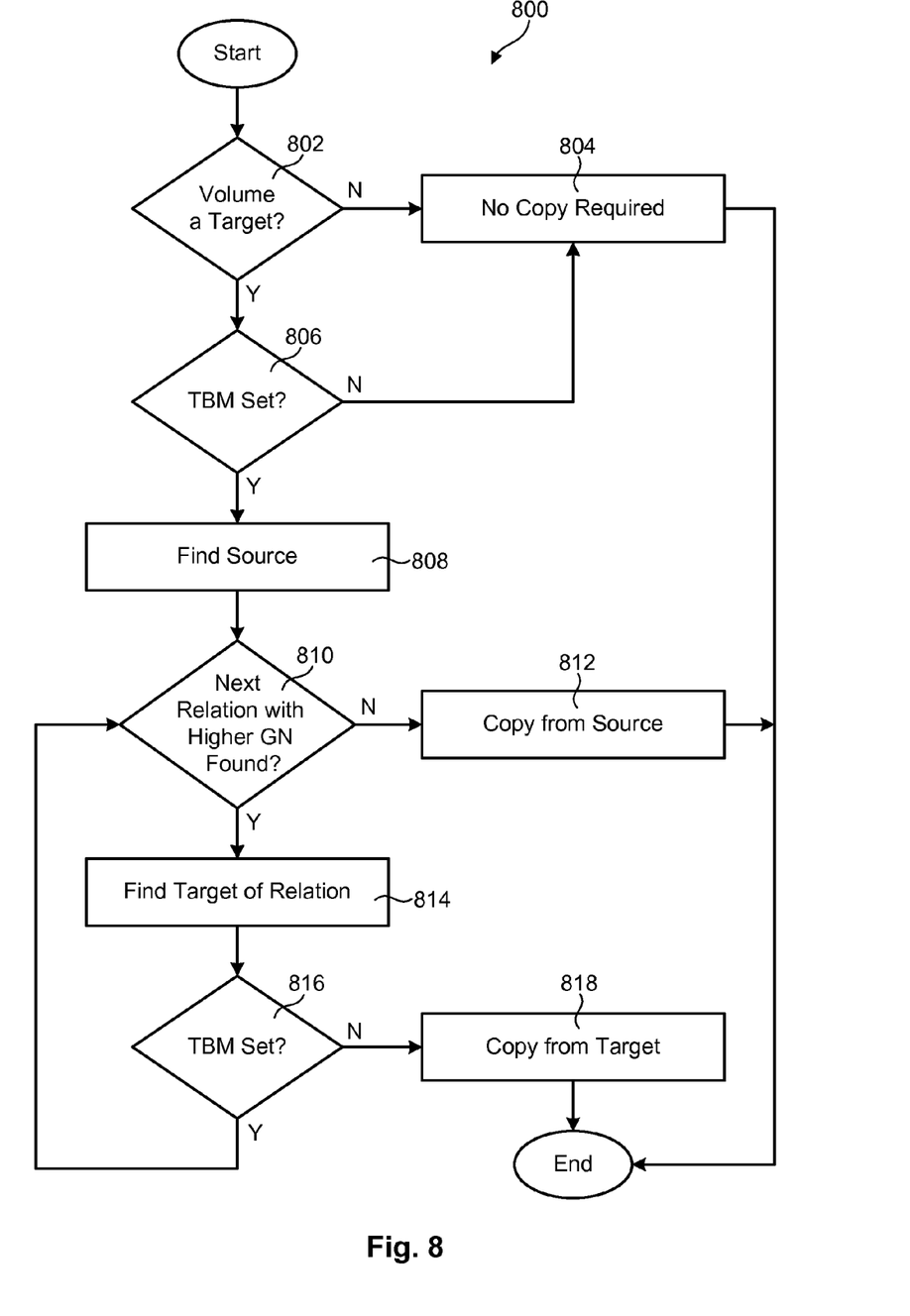
FIG. 8 is a flow diagram showing one embodiment of a method for finding a higher source (HS) volume in response to a write to a volume.

Referring to FIG. 8, one embodiment of a method 800 for finding the HS volume from which to copy data is illustrated. Such a method 800 may be used in association with step 604 of FIG. 6. As shown, the method 800 initially determines 802 whether the volume being written to is a target volume 304. If not, no copy is required as reflected at step 804. If the volume is a target volume 304, the method determines 806 whether the TBM of the volume is set. If the TBM is not set, no copy is required. If the volume is a target volume 304 and the TBM of the volume is set, the method finds 808 the source volume 302 associated with the target volume 304. The method 800 then finds the next relation with a higher generation number (GN) in the manner previously discussed.

Upon finding the next higher GN, the method 800 finds 814 the target 304 of this relation, which is a sibling of the target 304 identified at step 802. If the TBM of this sibling target 304 is not set 816 (indicating that it contains the desired data), the method 800 copies 818 the data from the sibling target 304 to the COS 304. If the TBM of this sibling target 304 is set 816 (indicating that it does not contain the desired data), the method 800 repeats steps 810, 814 to find the next younger sibling target 304 and determine 816 whether its TBM is set.

In this way, the method 800 traverses through the younger siblings of the target volume 304 identified at step 802 until the sibling target volume 304 containing the desired data is found. Once this data is found, the method 800 copies 818 the data from the sibling target 304 to the COS. If no sibling target 304 containing the desired data is found, the method 800 copies 812 the data from the source volume 302 to the COS. Once the data is copied, the write may be performed on the target 304 identified at step 802.

Figure 9:
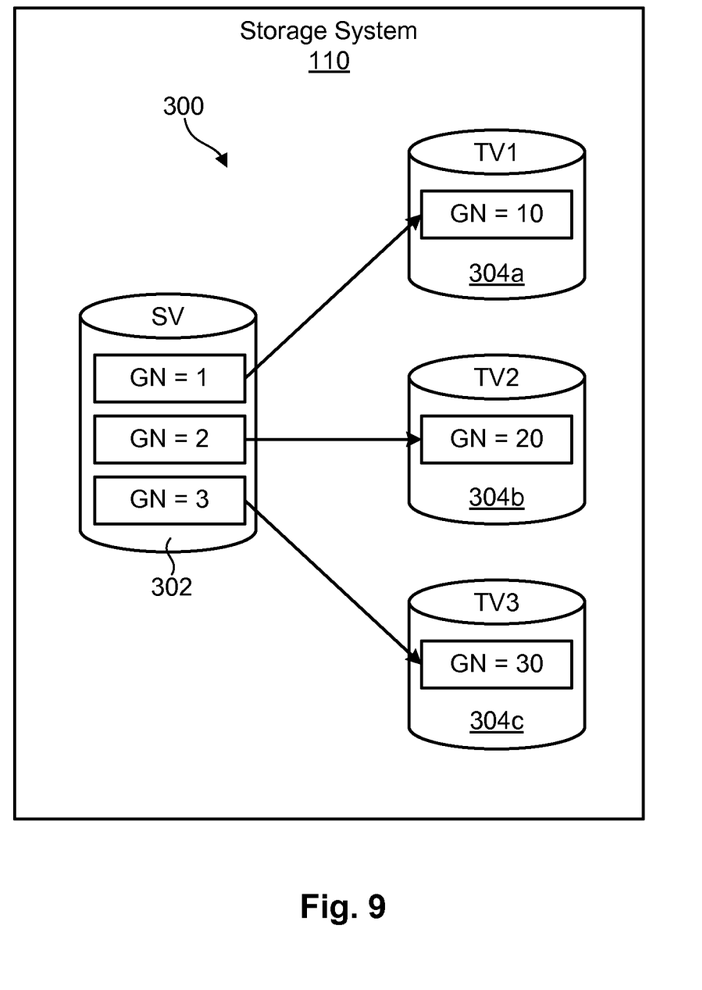
FIG. 9 is a high-level diagram showing one example of a multi-target architecture showing the use of generation numbers.

Referring to FIG. 9, one example of a multi-target architecture 300 showing the use of generation numbers (GNs) is illustrated. In this example, assume that the relation between the source volume (SV) 302 and a first target volume (TV1) 304a was created first, followed by the relation between the source volume 302 and a second target volume (TV2) 304b, followed by the relation between the source volume 302 and a third target volume (TV3) 304c. Each time a new relation is added to the source volume 302, the generation number is incremented. Thus, as shown on the source volume 302, the first relation is associated with a generation number of "1," the second relation is associated with a generation number of "2," and the third relation is associated with a generation number of "3."

Figure 10:
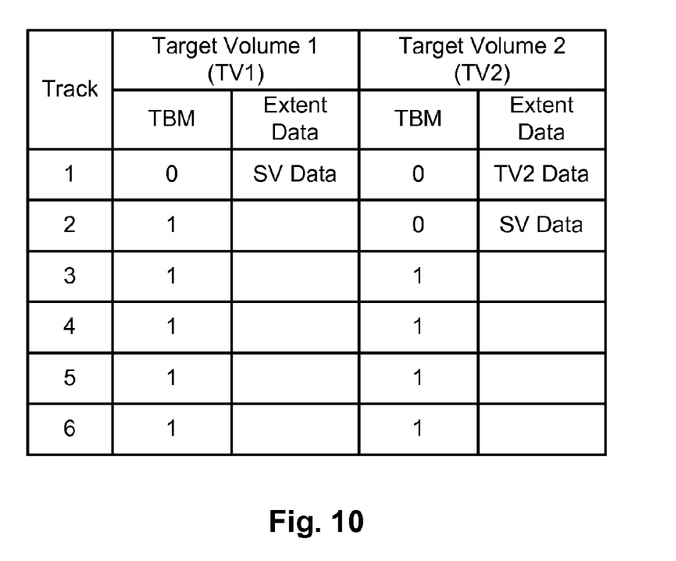
FIGS. 10 and 11 are tables showing data and TBM values for the volumes illustrated in FIG. 9 after various writes are made thereto.

Assume that relations are initially established between the source volume 302 and the first and second target volumes 304a, 304b, but the relation between the source volume 302 and the third target volume 304c is not yet established. In this scenario, to perform a write to track 1 of the second target volume 304b, the data in track 1 is copied from the source volume 302 (the higher source) to the first target volume 304a (the closest older sibling, or COS) and the TBM of the first target volume 304a is reset. The write is then performed to track 1 of the second target volume 304b and the TBM of the second target volume 304b is reset. Similarly, to perform a write to track 2 of the source volume 302, the data in track 2 is copied from the source volume 302 to the second target volume 304b (the youngest child, or YC) and the TBM of the second target volume 304b is reset (indicating that it now contains the data). The write is then performed to track 2 of the source volume 302. The data residing in the first target volume (TV1) 304a and the second target volume (TV2) 304b after the two writes described above is shown in FIG. 10. The values in the TBMs are also shown.

Assume that the third relation is now established between the source volume 302 and the third target volume 304c. To perform a write to track 3 of the source volume 302, the data in track 3 is copied from the source volume 302 to the third target volume 304c (the youngest child, or YC) and the TBM of the third target volume 304c is reset. The write is then performed to track 3 of the source volume 302. To perform a write to track 4 of the second target volume 304b, the data in track 4 is copied from the source volume 302 (the higher source) to the first target volume 304a (the closest older sibling, or COS) and the TBM of the first target volume 304a is reset. The write is then performed to track 4 of the second target volume 304b and the TBM of the second target volume 304b is reset.

Figure 11:
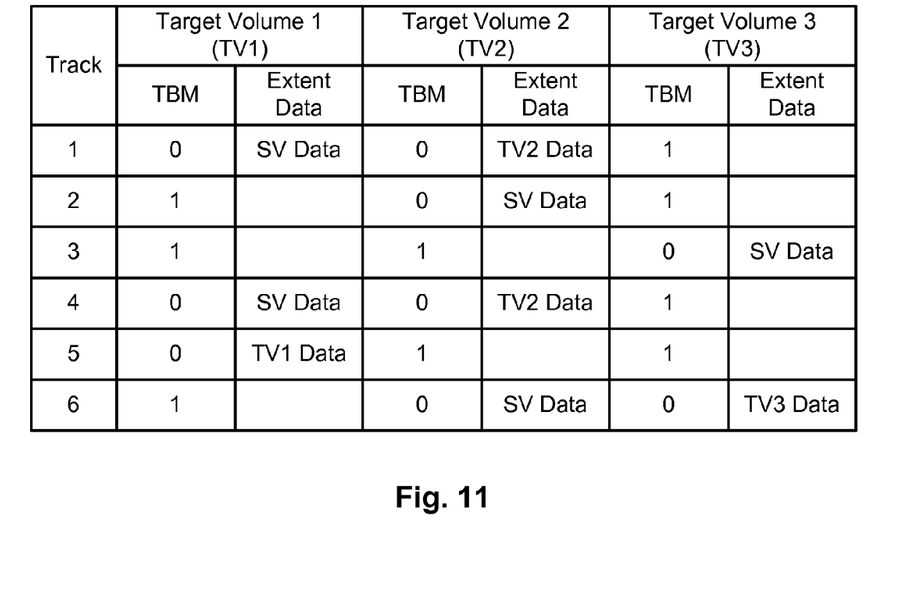

To perform a write to track 5 of the first target volume 304a, no copy is made since there is no closest older sibling, or COS. The write is then performed to track 5 of the first target volume 304a and the TBM of the first target volume 304a is reset. To perform a write to track 6 of the third target volume 304c, the data in track 6 is copied from the source volume 302 (the higher source) to the second target volume 304b (the closest older sibling, or COS) and the TBM of the second target volume 304b is reset. The write is then performed to track 6 of the third target volume 304c and the TBM of the third target volume 304c is reset. The data residing in the first target volume (TV1) 304a, the second target volume (TV2) 304b, and the third target volume (TV3) 304c after all six writes described above is shown in FIG. 11. The values in the TBMs are also shown.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for performing a write to a target volume (target x) in a multi-target architecture, the multi-target architecture comprising a source volume and a plurality of target volumes mapped thereto, the method comprising:

determining whether the target x has a closest older sibling (COS), wherein the target x and the COS are each a target volume containing a point-in-time copy of data in the source volume at a different point in time, and the COS is a target volume established just before the target x;

determining whether a target bit map (TBM) for each of the target x and the COS are set;

if the TBMs for both the COS and the target x are set, copying data from a higher source (HS) volume to the COS;

if the TBM for the COS is set and the TBM for the target x is not set, copying the data from the target x to the COS; and performing the write to the target x.

2. The method of claim 1, wherein finding the HS volume further comprises initially finding the source volume associated with the target x.

3. The method of claim 2, further comprising, by inspecting generation numbers (GN) on the source volume, finding the next younger sibling relative to the target x to determine if the next younger sibling is the HS volume.

4. The method of claim 3, further comprising, if a TBM of the next younger sibling is not set, copying the data from the next younger sibling to the COS.

5. The method of claim 3, further comprising, if no younger sibling exists, copying the data from the source volume to the COS.

* * * * *